(12) United States Patent
Fujiwara et al.

(10) Patent No.: US 6,634,974 B2
(45) Date of Patent: Oct. 21, 2003

(54) CHAIN GUIDE MEMBER, A CHAIN GUIDE MEMBER MANUFACTURING METHOD AND A CHAIN GUIDE MEMBER MANUFACTURING APPARATUS

(75) Inventors: Akira Fujiwara, Wako (JP); Atsushi Shirakawa, Wako (JP); Noriaki Matsumoto, Kyoto (JP)

(73) Assignees: Honda Giken Kogyo Kabushiki Kaisha, Tokyo (JP); Bando Chemical Industries, LTD, Hyogo-ken (JP)

( * ) Notice: Subject to any disclaimer, the term of this patent is extended or adjusted under 35 U.S.C. 154(b) by 0 days.

(21) Appl. No.: 09/853,030

(22) Filed: May 11, 2001

(65) Prior Publication Data

US 2002/0004433 A1 Jan. 10, 2002

(30) Foreign Application Priority Data

May 15, 2000 (JP) ........................................ 2000-142482

(51) Int. Cl.⁷ .................................................. F16H 7/08
(52) U.S. Cl. ...................... 474/111; 474/140; 264/255; 264/328.8
(58) Field of Search ................................. 474/101, 111, 474/140; 264/255, 241, 250, 328.8

(56) References Cited

U.S. PATENT DOCUMENTS

| | | | | |
|---|---|---|---|---|
| 4,826,468 A | * | 5/1989 | Friedrichs | .................... 474/101 |
| 4,832,664 A | * | 5/1989 | Groger et al. | ........... 123/90.15 |
| 5,120,279 A | * | 6/1992 | Rabe | ......................... 264/46.7 |
| 5,690,569 A | * | 11/1997 | Ledvina et al. | .............. 264/255 |
| 5,820,502 A | * | 10/1998 | Schulze | ...................... 474/111 |

FOREIGN PATENT DOCUMENTS

JP 2818795 8/1998

* cited by examiner

Primary Examiner—William C Joyce
Assistant Examiner—Timothy McAnulty
(74) Attorney, Agent, or Firm—Armstrong, Westerman & Hattori, LLP

(57) ABSTRACT

A chain guide member used in a chain transmission apparatus, and manufacturing method and apparatus thereof. The chain guide member has a sliding contact section extending along a traveling surface of a chain and coming into sliding contact with the chain, and a reinforcement main body reinforcing and supporting the sliding contact section along the traveling surface of the chain. A part or all of a joint portion between the sliding contact section and the reinforcement main body is joined by melting.

4 Claims, 5 Drawing Sheets

CHAIN GUIDE MEMBER, A CHAIN GUIDE MEMBER MANUFACTURING METHOD AND A CHAIN GUIDE MEMBER MANUFACTURING APPARATUS

BACKGROUND OF THE INVENTION

The present invention relates to a chain guide member such as a chain tensioner and a chain guide used in a chain transmission device, a manufacturing method thereof and a manufacturing apparatus thereof.

In a chain transmission device applied to a valve moving system of a four stroke cycle internal combustion engine, a chain tensioner for eliminating looseness of the chain or a chain guide for preventing disengagement of the chain from a sprocket has a sliding contact section coming into sliding contact with the chain. The sliding contact section is required to be made of a material having a good abrasion resistance and a low frictional resistance.

However, such a material is generally expensive and has low workability and low mechanical strength. Accordingly, in a chain guide member described in Japanese Patent No. 2818795, a reinforcement main body section of high mechanical strength and a sliding section of high abrasion resistance are piled up and extend in a chain traveling direction, and the reinforcement main body section and the sliding section are integrally connected through a dovetail joint.

According to the above-mentioned chain guide member of dovetail joint structure, the joint portion becomes necessarily thick from viewpoint of joint strength, the whole chain guide member is large-sized and cost-lowering and weight-reducing is difficult.

The chain guide member is manufactured in a manner that a supporting body with a dovetail key forming a greater part of the chain guide member is formed by injection, then a slide lining body is injected onto the support body. Therefore, when the slide lining body is formed by injection, temperature of the supporting member has been lowered, and resin for the slide lining body injected later comes into contact with the supporting body of low temperature to be cooled. As the result, the supporting body and the slide lining body are not joined integrally in a sufficiently melted state and the joint portion is weak.

SUMMARY OF THE INVENTION

In order to overcome the above-mentioned difficulties, the present invention provides a chain guide member having a sliding contact section extending along a traveling surface of a chain and coming into sliding contact with the chain and a reinforcement main body reinforcing and supporting the sliding contact section along the traveling surface of the chain, wherein a part or all of a joint portion between the sliding contact section and the reinforcement main body is joined by melting.

The sliding contact section and the reinforcement main body are connected to each other strongly, and miniaturization and cost-lowering of the chain guide member is possible.

The chain guide member may be made of thermoplastic resin. A cheap chain guide member having relatively high strength and good self-lubricating nature can be obtained.

The present invention provides a chain guide member manufacturing method, comprising steps of: partitioning a cavity of a mold by a partitioning member to form a space for forming a slide contact section of a chain guide member; injecting molten resin for the sliding contact section into the space; removing the partitioning member; and injecting molten resin for a reinforcement main body of the chain guide member into a remaining space of the cavity. According to the method, it is unnecessary to use respective molds for forming the sliding contact section and the reinforcement main body, and a chain guide member can be produced in a short time easily.

In the above chain guide member manufacturing method, a gas may be injected into the molten resin for the reinforcement main body injected into the cavity, a cave may be formed within the reinforcement main body in the cavity, and the reinforcement main body may be pressed against the sliding contact section by pressure of the gas within the cave. According to this method, the reinforcement main body and the sliding contact section can be connected more strongly and the chain guide member can be miniaturized.

The present invention provides a chin guide member manufacturing apparatus, comprising: a mold for forming a chain guide member; a partitioning member capable of going into a cavity of the mold to partition the cavity and form a space for a sliding contact section of the chain guide member; means for driving the partitioning member into the cavity; means for injecting molten resin for the sliding contact section into the space for the sliding contact section; and means for injecting molten resin for a reinforcement main body of the chain guide member into a space for the reinforcement main body in the cavity other than the space for the sliding contact section. According to this apparatus, the above-mentioned chain guide member manufacturing method can be carried out easily and surely.

The above manufacturing apparatus may include an opening for injecting molten resin for the slide contact section positioned on one end of the chain guide member, and an opening for injecting molten resin for the reinforcement main body positioned on another end of the chain guide member. According to this manufacturing apparatus, a portion of the resin for sliding contact section positioned near the opening for injecting molten resin for the reinforcement main body that has been injected most early and cooled is re-heated by molten resin for reinforcement main body injected from the opening for the reinforcement main body to prevent lowering of the temperature. On the other hand, a portion of the resin for the sliding contact section positioned near the opening for injecting resin for the sliding contact section that has been injected most lately is kept in relatively high temperature. As the result, temperature of the sliding contact section is kept substantially equal over the total length. Therefore, the sliding contact section resin and the reinforcement main body resin are melt-joined substantially equally and strongly along the total length of the chain guide member, and strength and durability of the chain guide member are improved remarkably.

DETAILED DESCRIPTION OF THE PREFERRED EMBODIMENT

Hereinafter, an embodiment of the present invention will be described with reference to FIGS. 1 to 5.

Figure 1:
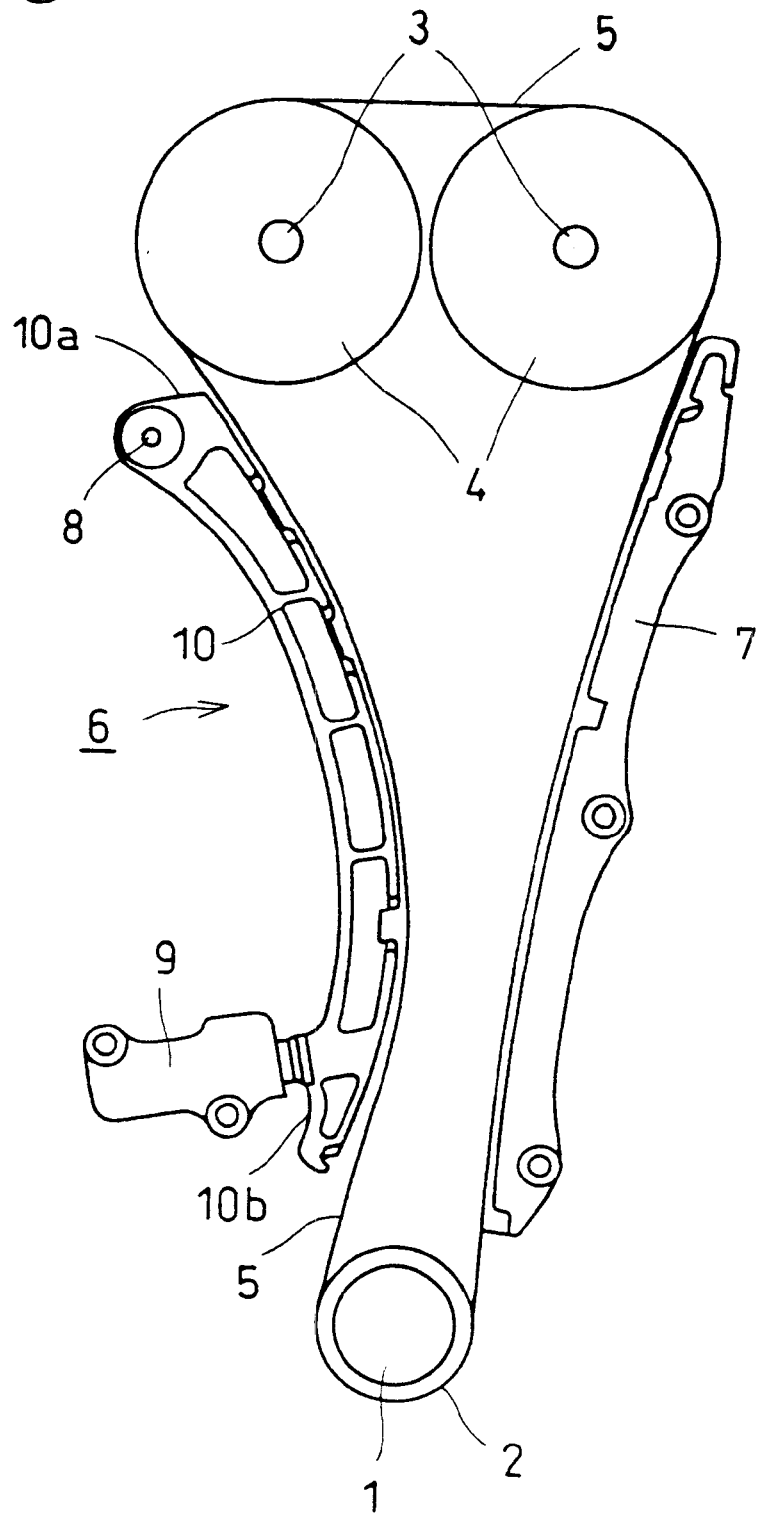
FIG. 1 is a schematic view of a chain power transmission mechanism having a chain guide member of the present invention.

FIG. 1 shows a chain power transmission mechanism in a valve moving system of a four stroke cycle internal combustion engine (not shown). An endless chain 5 is wound round a drive sprocket 2 fixed to a crankshaft 1 rotating clockwise and driven sprockets 4 fixed to camshafts 3. A chain tensioner 6 for eliminating looseness of the chain 5 is disposed on a loose side (left side in FIG. 1) of the chain 5, and a chain guide 7 is disposed on a strained side of the chain 5.

A chain guide member 10 constituting above-mentioned chain tensioner 6 has an upper end 10a pivoted on a pivot 8 supported by a main body of the internal combustion engine so that the chain guide member 10 can be rocked about the pivot 8 supported by a main body of the internal combustion engine so that the chain guide member 10 can be rocked about the pivot 8 right and left. A lifter 9 is provided at a lower portion 10b of the chain guide member 10 when the chain 5 is loosened, the lifter rocks the chain guide member 10 about the pivot 8 counterclockwise. After looseness of the chain 5 is eliminated and the chain 5 is strained, the chain guide member 10 is fixed to the position by a pressing holding force of the lifter 9 so that the chain 5 is not loosened.

The chain guide member 10 comprises a sliding contact section (a section coming into sliding contact with the chain) 11 made of nylon-46 curved along a traveling surface of the chain, and a reinforcement main body 12 joined with the sliding contact section 11 by melting as will be described later. The reinforcement main body 12 is strengthened by glass fiber mixed at a ratio of about 40% (30%–50%).

Figure 2:
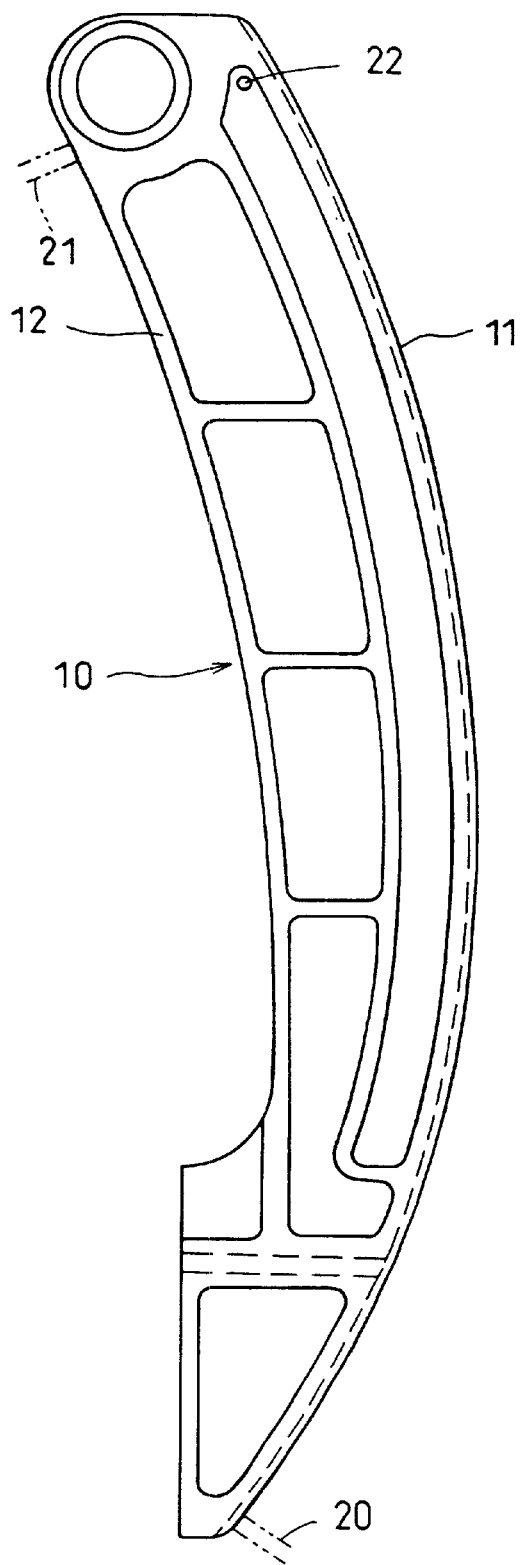
FIG. 2 is a side view of the chin guide member.
Figure 3:
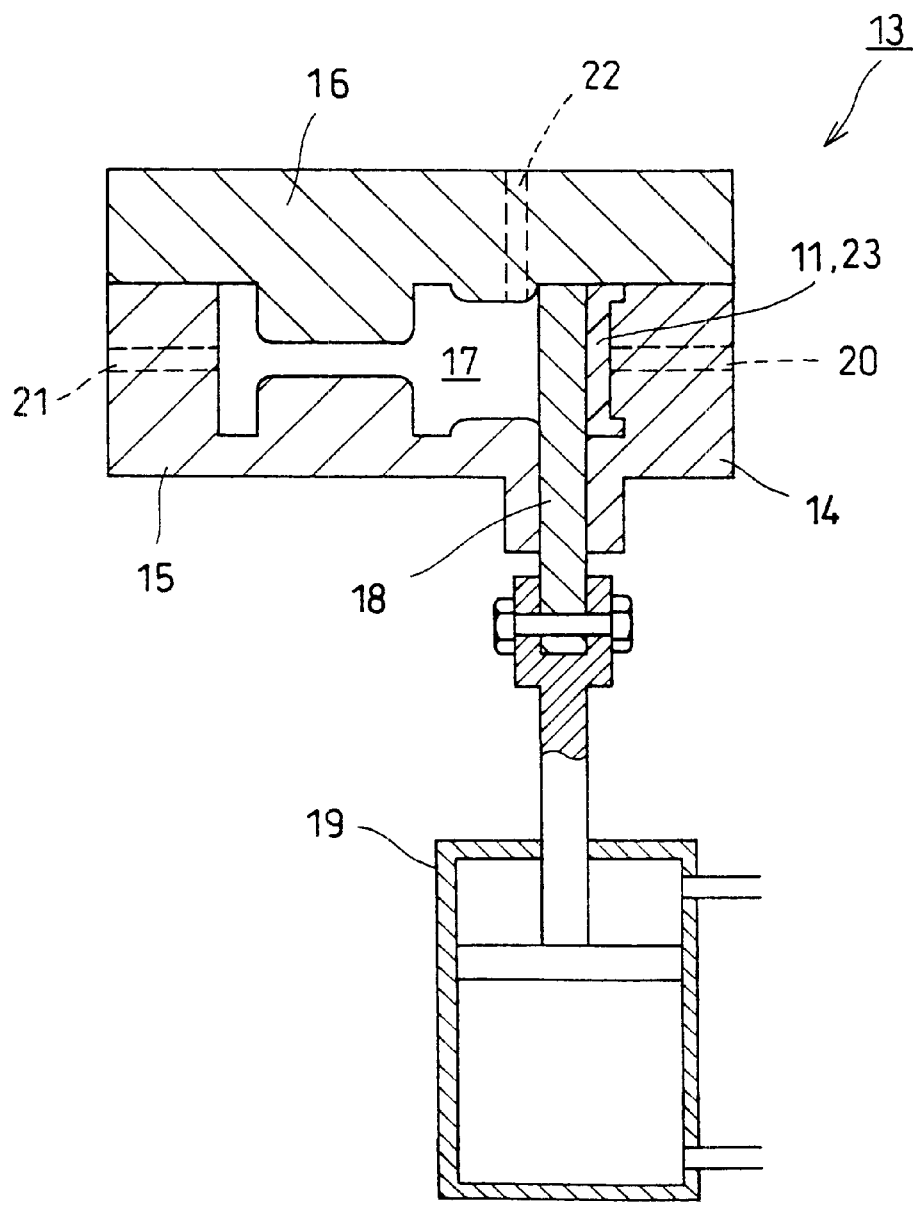
FIG. 3 is a sectional view of a chain guide member manufacturing apparatus showing its initial manufacturing stage.
Figure 4:
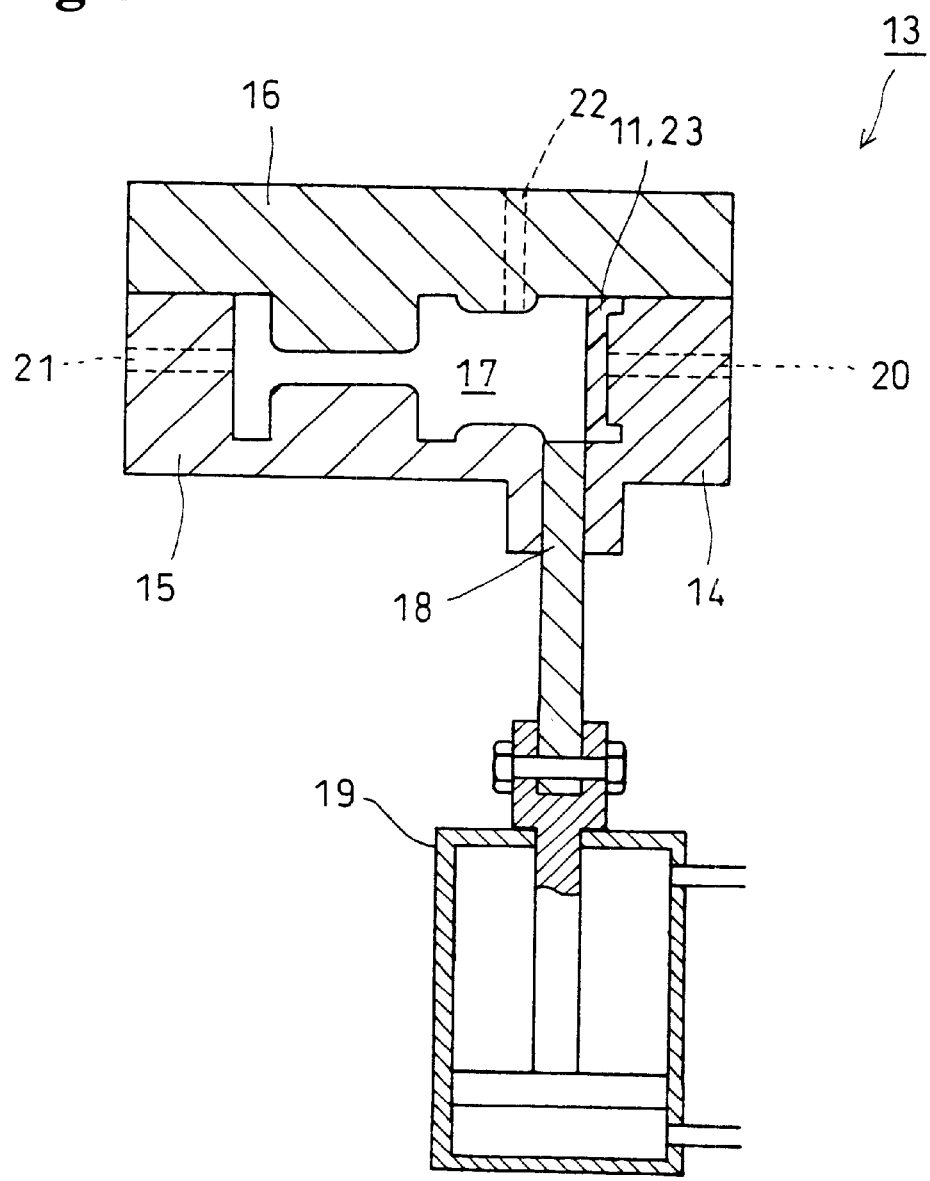
FIG. 4 is a sectional view of the chain guide member manufacturing apparatus showing its middle manufacturing stage.
Figure 5:
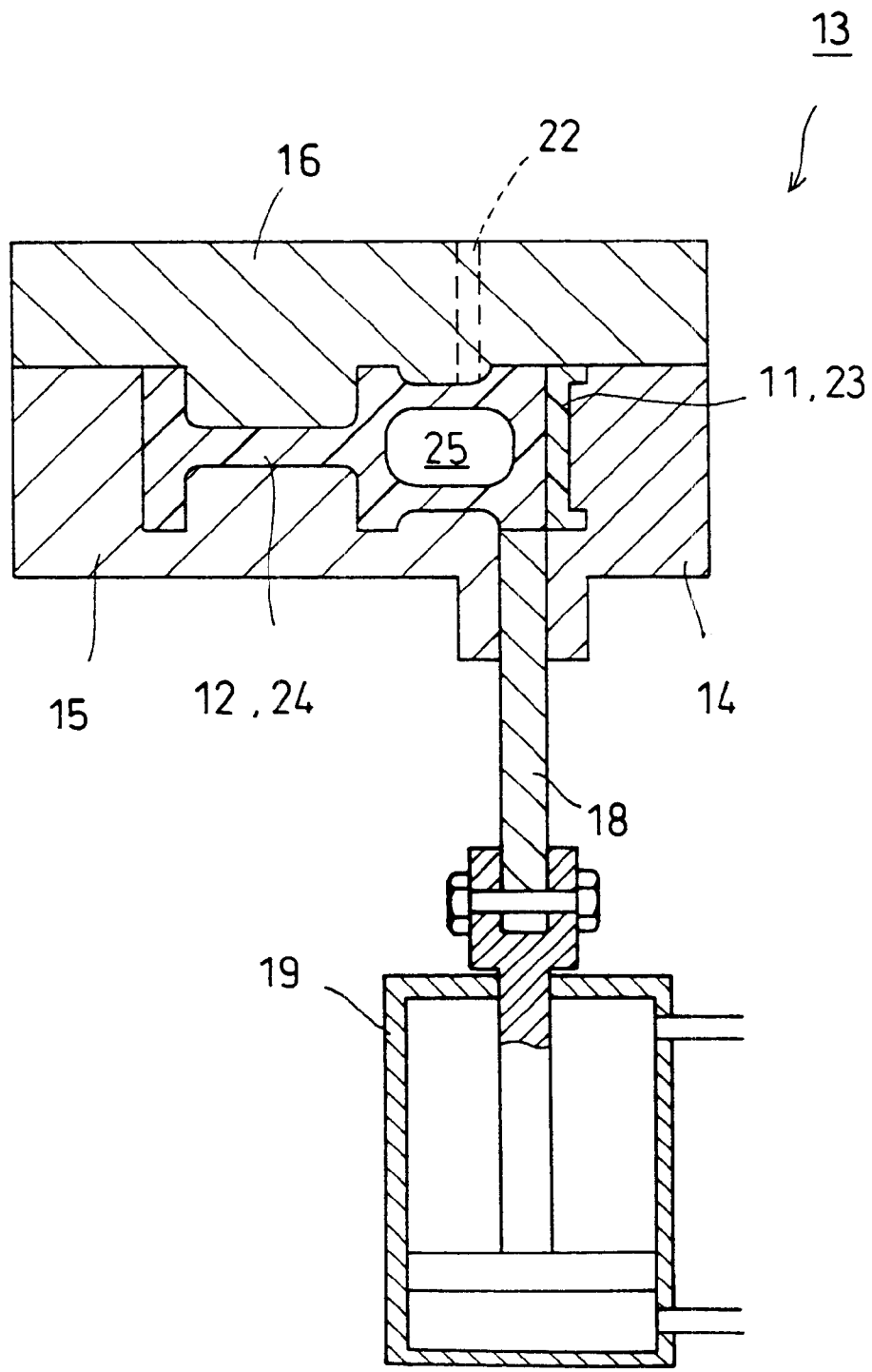
FIG. 5 is a sectional view of the chin guide member manufacturing apparatus showing its final manufacturing stage.

A chain guide member manufacturing apparatus 13 for manufacturing the above-mentioned chain guide member is shown in FIGS. 3 to 5. The apparatus 13 comprises three separate molds 14, 15, 16, a partitioning member 18 capable of going into a cavity 17 formed by the molds 14, 15, 16 to partition the cavity, a partitioning member driving air cylinder 16 for driving the partitioning member 18 into the cavity 17, a sliding contact section injecting apparatus (not shown) for injecting nylon-46 23 through a sliding contact section injecting passage 20 provided in the mold 14 at a position shown in FIG. 2, and a reinforcement main body injecting apparatus (not shown) for injecting nylon-46GF 24 with glass fiber of 40% mixed through a reinforcement main body injecting passage 21 provided in the mold 15 at a position shown in FIG. 2. The mold 16 is formed with a pressurized gas charging passage 22 for charging a pressurized gas at a position shown in FIG. 2.

In addition, an injection control apparatus for controlling action of the partitioning member driving air cylinder 19, injecting action of the sliding contact section injecting apparatus and injecting action of the reinforcement main body injecting apparatus, and mold temperature control apparatus for controlling temperature of the molds 14, 15, 16 are provided.

In a state that temperature of the molds 14, 15, 16 are kept at about 130° C., the partitioning member 18 is projected into the cavity 17 by the partitioning member driving air cylinder 19, and then into a space of the cavity 17 partitioned by the partitioning member 18 is injected molten nylon-46 23 of about 300° C. during 3 seconds through the sliding contact section injecting passage 20 from the sliding contact injecting apparatus. When a time of 1 second elapses after the completion of the injection, the partitioning member 18 is pulled out from the cavity 17 by the partitioning member driving air cylinder 19, and immediately nylon-46GF 24 of about 300° C. mixed with glass fiber of 40% is injected into the cavity during about 4 seconds through the reinforcement main body injecting passage 21 from the reinforcement main body injecting apparatus. Simultaneously, a high pressure gas is charged into the nylon-46GF 24 within the cavity 17 through the pressurized gas charging passage 22 (during about 15 seconds). After cooling time of about 30 seconds, the chain guide member 10 is taken out from the molds 14, 15, 16. After 10 seconds, next chain guide member manufacturing can be started.

Thus, during the nylon-46 23 for the sliding contact section 11 has not been sufficiently solidified yet, the nylon-46GF 24 having a volume larger that that of the sliding contact section 11 is injected to join the sliding contact section 11 and the reinforcement main body 12 to each other by melting. Therefore, the sliding contact section 11 and the reinforcement main body 12 can be joined integrally and strongly, the joined portion can be made thin and the chain guide member 10 can be formed compact.

A cave 25 is formed in the reinforcement main body by charging the high pressure gas into the injected nylon-46GF 24 and a joining portion of the reinforcement main body 12 adjacent to the sliding contact section 11 is strongly pressed against the sliding contact section 11 by the high pressure gas in the cave 25. Therefore, melt-joining of the sliding contact section 11 and the reinforcement main body 12 can be carried out more precisely and surely.

As shown in FIG. 2, the sliding contact section injecting passage 20 and the reinforcement main body injecting passage 21 are positioned at both ends of the chain guide member 11 respectively. Therefore, a part of the nylon-46 23 of relatively low temperature injected from the sliding contact section injecting passage 20 early and having reached a neighborhood of the pressurized gas charging passage 22 is heated by nylon-46GF 24 injected from the reinforcement main body injecting passage 21, and a part of the nylon-46GF 24 injected from the reinforcement main body injecting passage 21 early and having reached a neighborhood of the sliding contact section injecting passage 20 comes into contact with a part of the nylon-46 23 that is not so cooled. Accordingly, the nylon-46 23 and the nylon-46GF 24 are contacted with each other at a substantially uniform temperature condition all over the length of the chain guide member 10, so that the sliding contact section 11 and the reinforcement main body 12 are integrally joined uniformly over all the length of the chain guide member 10.

Since the sliding contact section 11 of smaller volume is injected early and then the reinforcement main body 12 of larger volume is injected, the joining portions of the sliding contact section 11 and the reinforcement main body 12 are kept at a sufficiently high temperature by the reinforcement main body 12 of larger volume so that sufficient melt-joining is possible.

The present invention can be applied to the chain guide 7 as well as the chain guide member 10 comprising the sliding contact section 11 and the reinforcement main body 12.

In the above embodiment, both the sliding contact section 11 and the reinforcement main body 12 are made of the same kind of nylon-46 and the reinforcement main body 12 is strengthened by glass fiber. However, the sliding contact section 11 may be made of a thermoplastic resin that has high self-lubricating nature and low friction though mechanical strength and rigidity are low, and the reinforcement main body 12 may be made of other thermoplastic resin having high mechanical strength and rigidity.

What is claimed is:

1. A chain guide member having a sliding contact section extending along a traveling surface of a chain and coming into sliding contact with said chain, and a reinforcement main body reinforcing and supporting said sliding contact section along said traveling surface of the chain, wherein said sliding contact section and said reinforcement main body comprise a cast joint portion meltedly fixing said sliding contact section with said reinforcement section.

2. A chain guide member as claimed in claim 1, wherein said chain guide member is made of thermoplastic resin.

3. The chain guide member as claimed in claim 1, wherein said sliding contact section is made of nylon-46 and said reinforcement main body is made of a strengthened nylon-46 mixed with glass fiber in a ratio of about 30% to about 50%.

4. The chain guide member as claimed in claim 3, wherein said reinforcement main body is made of a strengthened nylon-46 mixed with glass fiber in a ratio of 40%.

* * * * *